March 18, 1952 A. C. KOWALSKI 2,589,617

PULSE AMPLITUDE MODULATION COMMUNICATION SYSTEM

Filed July 7, 1947 9 Sheets-Sheet 1

INVENTOR.
ALFRED C. KOWALSKI
BY
Huebner, Maltby & Beehler
ATTORNEYS

PULSE AMPLITUDE MODULATION COMMUNICATION SYSTEM

Filed July 7, 1947 9 Sheets-Sheet 2

INVENTOR.
ALFRED C. KOWALSKI
BY
Huebner, Maltby & Beehler
ATTORNEYS

March 18, 1952 A. C. KOWALSKI 2,589,617

PULSE AMPLITUDE MODULATION COMMUNICATION SYSTEM

Filed July 7, 1947 9 Sheets-Sheet 3

INVENTOR.
ALFRED C. KOWALSKI
BY
Huebner, Maltby & Beehler
ATTORNEYS

INVENTOR.
ALFRED C. KOWALSKI
BY
Huebner, Maltby & Beehler
ATTORNEYS

March 18, 1952 A. C. KOWALSKI 2,589,617

PULSE AMPLITUDE MODULATION COMMUNICATION SYSTEM

Filed July 7, 1947 9 Sheets-Sheet 5

INVENTOR.
ALFRED C. KOWALSKI
BY
Huebner, Maltby & Beehler
ATTORNEYS

INVENTOR.
ALFRED C. KOWALSKI
BY
Huebner Maltby & Beehler
ATTORNEYS

INVENTOR.
ALFRED C. KOWALSKI
BY
Huebner, Maltby & Beller
ATTORNEYS

INVENTOR.
ALFRED C. KOWALSKI
BY
Huebner, Maltby & Beehler
ATTORNEYS

INVENTOR.
ALFRED C. KOWALSKI
BY
Huebner, Maltby + Beehler
ATTORNEYS

Patented Mar. 18, 1952

2,589,617

UNITED STATES PATENT OFFICE 2,589,617

PULSE AMPLITUDE MODULATION COMMUNICATION SYSTEM

Alfred C. Kowalski, Fresno, Calif.

Application July 7, 1947, Serial No. 759,422

4 Claims. (Cl. 250—6)

This invention relates to methods and systems of radio communication and has particular reference to signaling and receiving of radio waves modulated by high audio or video frequencies on a narrow transmission band.

The present invention is of particular significance in the elimination of amplitude variation problems and interference in multiplex signaling, television, and the like. Of further significance is the retention of the advantages with the elimination of the wide band requirement of high-fidelity, noise-free radio transmission as known, for example, in frequency modulation, pulse time, or pulse-duration systems. By the accommodating of a wide range of modulating frequencies on an extremely narrow band the transmission of television on a narrow band of frequencies is made practical.

An object of the invention is to effect improved radio communication having high fidelity characteristics and high signal to noise ratio.

Another object is to conserve space in the broadcast spectrum.

Another object is to provide an improved method and apparatus for radio communication involving only a narrow band of transmission frequencies approaching a single frequency in width.

Another object is to provide a pulse system of electromagnetic communication in which the frequency and phase of the carrier wave is constant and the amplitude of each pulse controlled to conform to intelligence transmitted.

Another object is to provide a system in which electronic means are employed to effect controlled variation of amplitude of a transmitted wave and to reproduce signaling currents through translation of the amplitude variations of the received wave.

Another object is to minimize side bands in radio communication.

Another object is to produce radio waves of improved symmetry to minimize distortion.

Another object is to provide an electrical system for producing pulses of controlled starting and stopping characteristics.

Another object is to provide a method and apparatus for securing rapid adjustment of the amplitude of alternating and pulse currents without resultant changes in phase and wave shape.

Another object is to provide an improved amplifier adapted to amplify high frequencies.

Another object is to provide a radio frequency amplifier characterized by an absence of oscillatory effects.

Another object is to amplify radio frequencies without recourse to tuned coupling circuits.

Another object is to provide in high frequency amplification means characterized by a minimizing attenuation of high frequencies.

Another object is to provide selective circuits in the system of the present invention eliminating undesired frequencies and thus minimizing interference.

Another object is to provide an improved filter for selecting desired radio frequency by the elimination of all other frequencies and means incorporated therein for preventing associated resonant circuits from freely oscillating.

Other objects and advantages will become apparent in the further description in the specification.

Figures 18, 19:
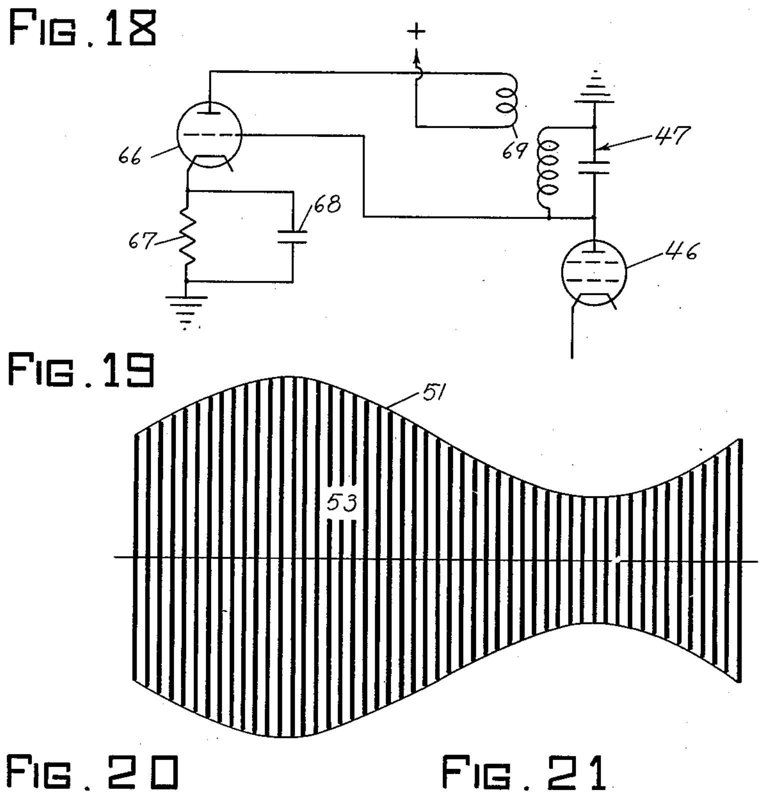
Fig. 18 is an electrical diagram illustrating a feed back arrangement employed to feed the tank circuit, previously shown in Fig. 17, during oscillations.

Fig. 19, in which each vertical line represents a single pulse, illustrates amplitude modulated pulse current characteristic of the transmitter of the present invention.

Figure 20:
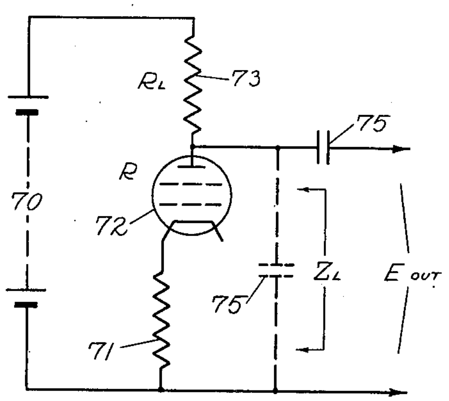

Fig. 20, for purposes of illustration, is a diagram of a conventional resistance coupled amplifier.

Figure 21:
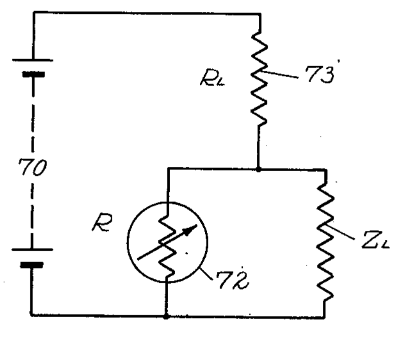

Fig. 21 is an equivalent circuit to that shown in Fig. 20.

Figure 22:
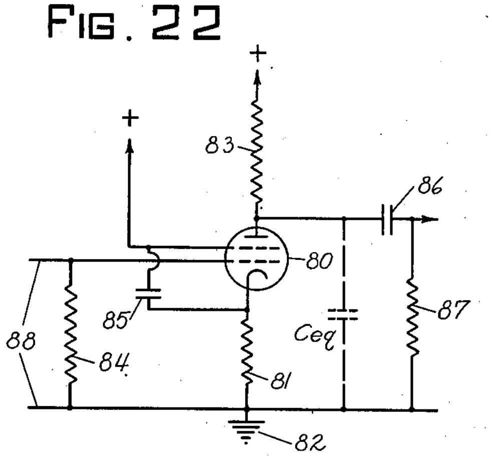

Fig. 22 is an electrical diagram of a conventional voltage amplifier offered for purposes of illustration.

Figure 23:
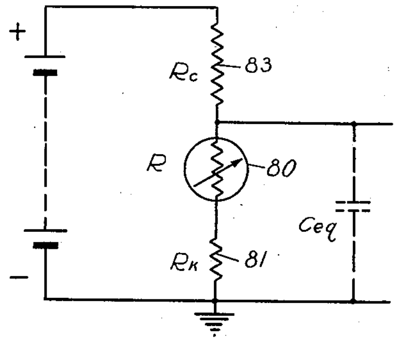

Fig. 23 is a circuit equivalent to that shown in Fig. 21.

Figure 24:
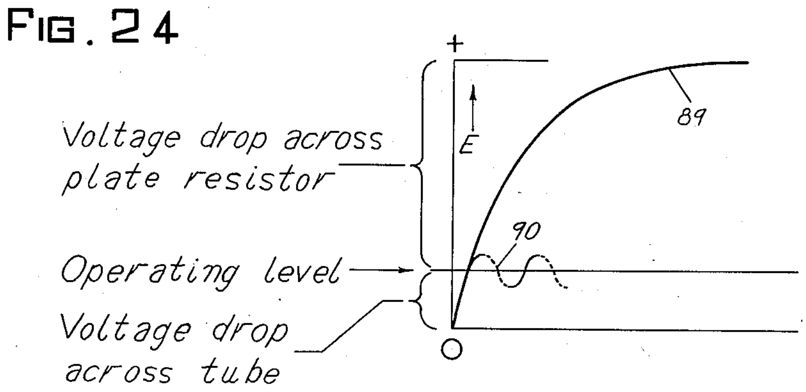

Fig. 24 graphically compares an amplified voltage and a charging curve.

Figure 25:
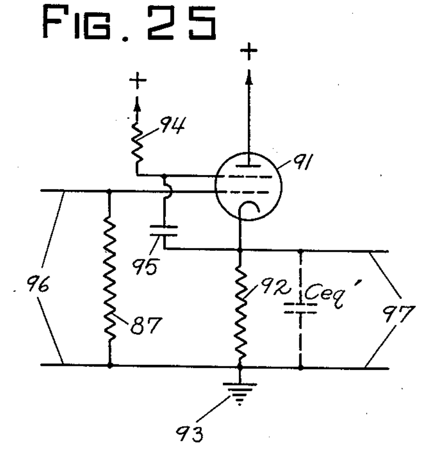

Fig. 25 is an electrical diagram of a cathode follower utilizing a beam tetrode and coupling between cathode and screen grid.

Figure 26:
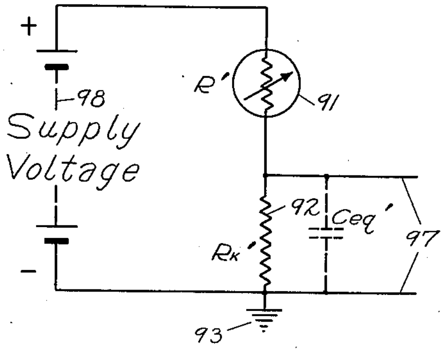

Fig. 26 is a circuit equivalent to that shown in Fig. 24.

Figure 27:
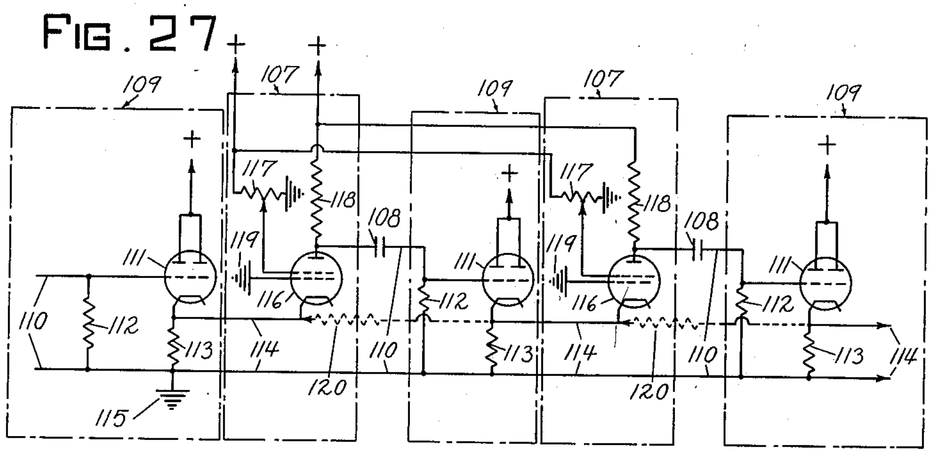

Fig. 27 is an electrical diagram of an untuned amplifier of the present invention illustrating units thereof in block diagram.

Figures 28, 29:
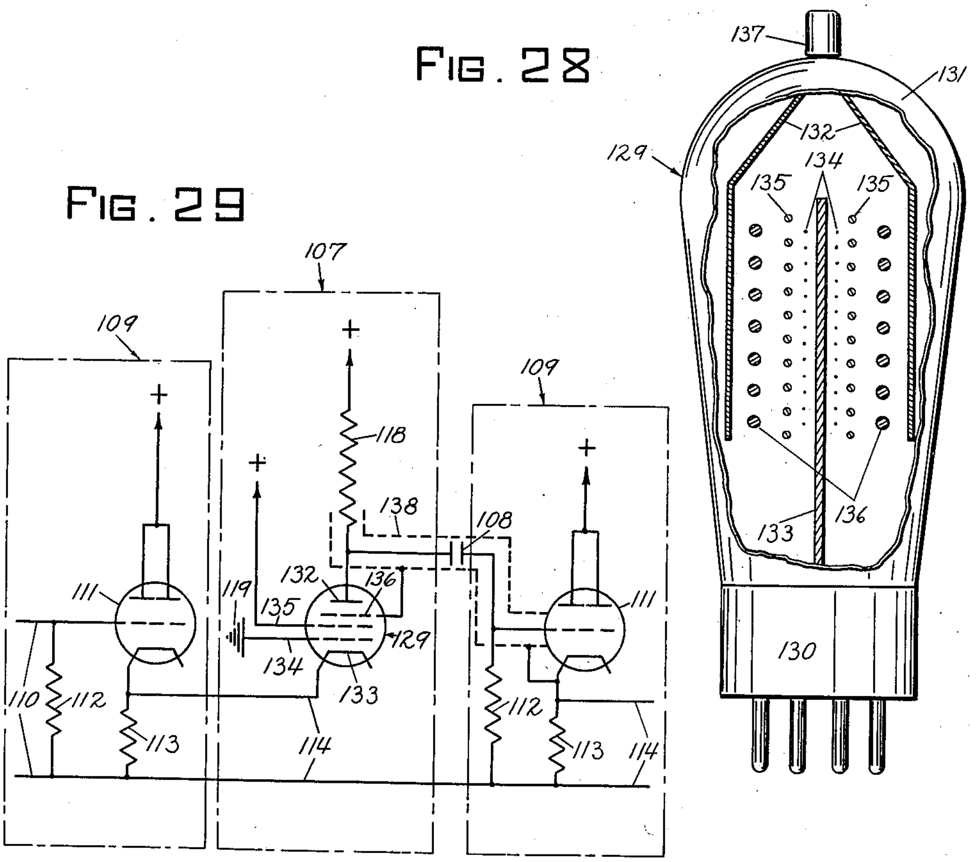

Figs. 28 and 29 demonstrate a modification of the untuned amplifier resulting in an extension of the upper frequency limit.

Figure 30:
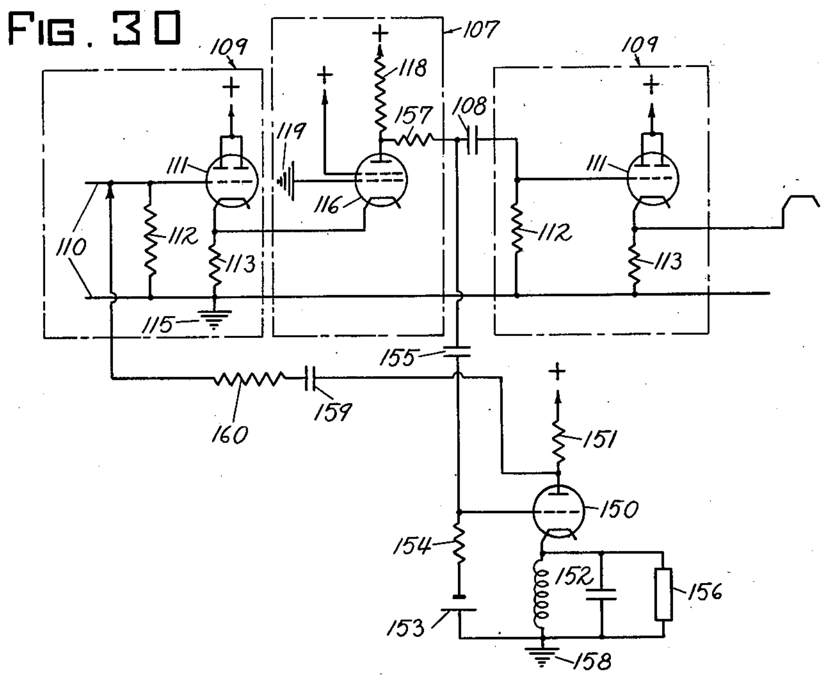

Fig. 30 is an electrical diagram of a filter of the present invention.

Figure 31:
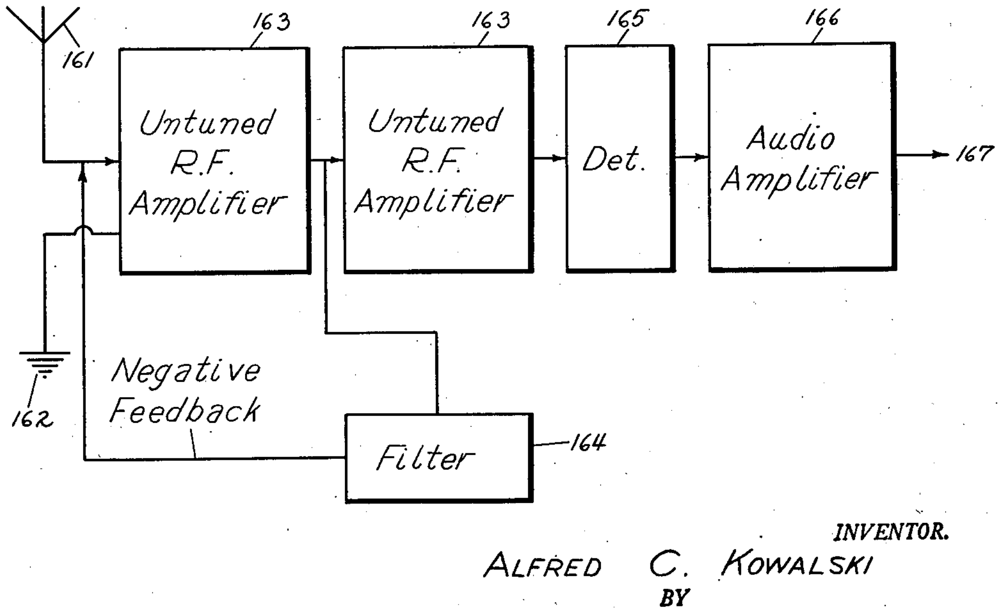

Fig. 31 is a block diagram of a typical receiver of the present invention.

The present inventor is well aware of the many unsuccessful attempts to transmit and receive modulated radio waves on a narrow frequency band that have led to a discrediting of such oft propounded theories of radio communication. The method and systems of the present invention make possible the transmission and reception of radio waves modulated by the highest audio and video signals on an extremely narrow band approaching a single frequency in width. Because of the general skepticism currently encountered, preliminary attention is briefly directed to prior experiments in this field.

The earliest modulation methods were a very natural outgrowth of the desire to transmit intelligence directly rather than by code, and were introduced and successfully operated by experimenters long before they were rationalized by mathematicians. It is significant that the term "amplitude modulation" was used because early experimenters believed that they were simply increasing and decreasing the power of the carrier wave. When it was proved that sidebands accompany the carrier during modulation and must be received in order to extract the modulation, there arose no flurry of design change, inasmuch as this entailed no change in equipment or methods.

Figure 1:
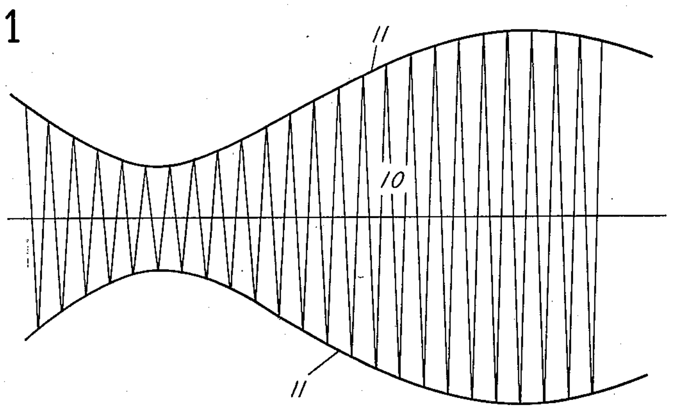
Fig. 1 is a schematic representation of a carrier wave subjected to conventional amplitude modulation.

Fig. 1 is a conventional representation of amplitude modulation showing a carrier wave 10 having its amplitude varied, as delineated by envelope 11, in accordance with intelligence being transmitted. In the analysis the formula for sidebands is cited.

$$e=E_0 \sin 2\Pi ft+\frac{mE_0}{2}\cos 2\pi(f-f_s)t-\frac{mE_0}{2}\cos 2\Pi(f+f_s)t$$

wherein:

$e$=instantaneous amplitude of wave
$E_0$=average amplitude of wave
$f$=frequency
$t$=time
$m$=degree of modulation
$f_s$=modulation frequency The first term $E_0 \sin 2\Pi ft$ is referred to as the carrier and proves to be unvarying in amplitude regardless of the degree of modulation or the modulation frequency.

Actually, all present-day modulation methods do operate so as to validate the formula, and upper and lower sidebands are produced, transmitted, received and amplified as separate frequencies. As long as transmission or amplification is accomplished by means of a linear device these frequencies appear as separate entities; however at the detector, a non-linear device, they recombine and the modulation is "detected." The process at this point is simply the heterodyne action of producing a lower frequency from the combination of higher frequencies. For two sine waves $E_s$ and $E_0$ $$\text{Instantaneous amplitude of envelope}=\sqrt{E_s^2+E_0^2+2E_sE_0\cos wt}$$

$$\frac{W}{2\Pi}=\text{difference in frequency}$$

The diagram of Fig. 1 is then correct when considering voltages within the tank circuit or antenna, and similarly at the grid of the detector; however the basic concept must be recognized that transfer of power by electromagnetic means implies the existence of all frequencies involved as separate and distinct entities. From this it is deduced that electromagnetic waves cannot exist in any form other than a sine wave.

Figure 2:
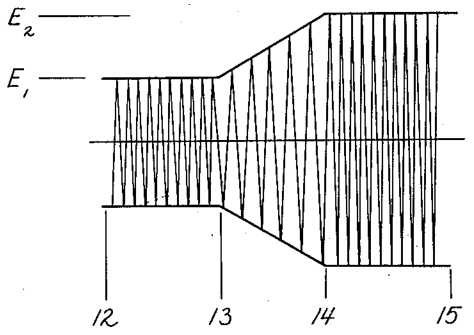
Fig. 2 is a schematic representation of a carrier wave showing two portions of constant amplitude and an interconnecting transitional portion exemplary of conventional distortion incident to amplitude change.
Figure 3:
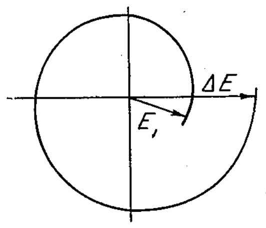
Fig. 3 is a vector diagram of one cycle of the amplitude change shown in Fig. 2.
Figure 4:
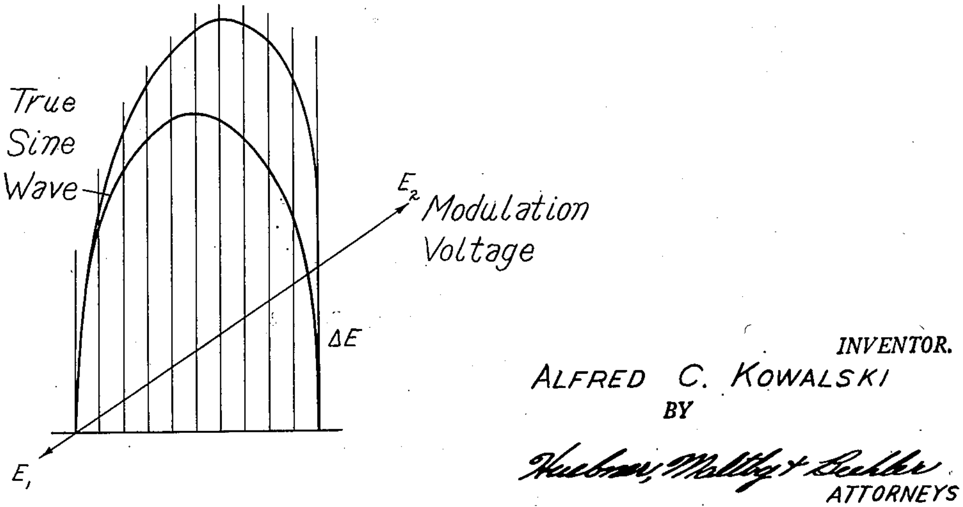
Fig. 4 is an expanded representation of a half cycle of a wave selected from the portion 13—14 of Fig. 2 illustrative of amplitude change.

Attention at this point is appropriately directed to the production of side bands. It is implicit in the definition of a sine wave that amplitude is constant. When the amplitude is increased or decreased by contemporary modulation methods the wave shape departs from the true sine. Fig. 2 is illustrative of this. A true sine wave is indicated between 12 and 13 and between 14 and 15, respectively of amplitudes $E_1$ and $E_2$. An increase in amplitude from $E_1$ to $E_2$ occurs in the time 13—14. During the period 13—14, the true sine wave form is not retained. This is clear in the exaggerated vector diagram of Fig. 3. During each cycle within 13—14, there is a new component introduced which causes the amplitude $E_1$ to increase and has as a concomitant effect the distortion of the sine wave. In greatly expanded form in Fig. 4, a half cycle taken from the time period 13—14 is shown. The increase in modulation voltage and the responsive distortion from sine form is clearly evident.

In analyzing the operation of a transmitter it is not sufficient to regard tuned circuits thereof merely as high impedances. If a charged capacitance is placed across the inductance of an isolated circuit, an oscillatory condition is manifest; the capacitor discharges through the inductance, but at a point 180° from the start of this discharge all of the energy is contained in the magnetic field; the magnetic field, not being self-supporting, then collapses, charging the capacitor in the opposite direction. At this point there is no energy in the magnetic field; it all having returned to the capacitor. This process of exchange of energy would continue indefinitely except for the inevitable losses in the elements.

Figure 5:
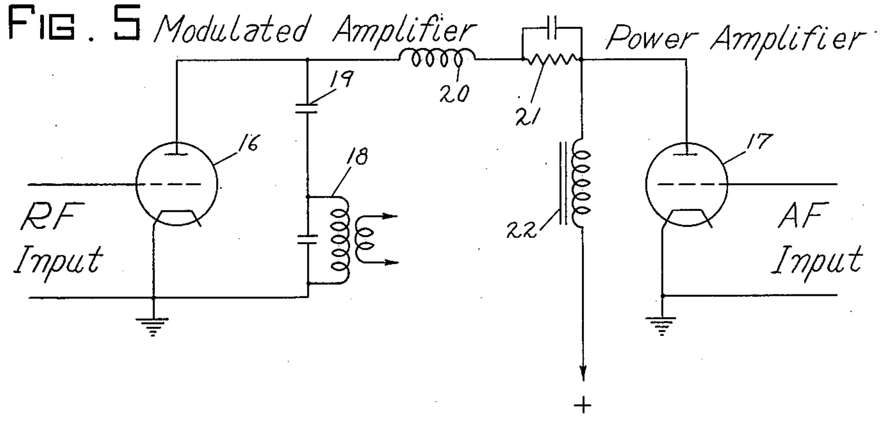
Fig. 5 is a schematic diagram of a conventional class "C" amplifier and modulator.

For purposes of clarity of explanation, a Class C amplifier conventionally employing triodes 16 and 17, a tank circuit 18, blocking condenser 19, R. F. choke 20, voltage dropping resistance 21, and coupling inductance 22; is shown in Fig. 5. When the starting characteristics of such an amplifier are considered and a full grid swing is assumed immediately upon starting, the tuned circuit acts as a very low impedance because all the energy is absorbed by the capacitor. Not until the full oscillatory condition is approached after a number of cycles are its high impedance properties manifest. It possesses these properties simply because, during the cycle of operation, electron current through the tube of such an oscillatory circuit is opposed to the electron current resulting from the magnetic field. Stated otherwise, the potential of each circuit varies simultaneously in such manner that there is no difference between them consequently no flow of current. In actual practice the tube must supply enough additional electrons to replace the energy lost in the circuit resistance, as well as the power removed from the circuit for radiation.

Figure 6:
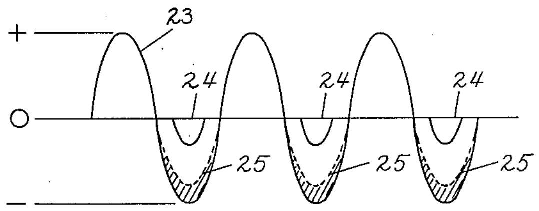
Fig. 6 is a chart of the voltages experienced at the plate end of the tank circuit of the class "C" amplifier.

It is noteworthy that the tank circuit 18, in Fig. 5 operates as a freely oscillating circuit. Losses are replaced by current pulses through the tube 16, but the replacement occurs only during the cycle when the tank circuit 18 is being charged to a negative potential. Fig. 6 illustrates this condition by charting the voltage at 23 as experienced at the plate end of the tank circuit.

Power added by replacement pulses is shown at 24, the effect of said pulses being schematically represented by the area between dotted line 25, indicating current as decreased by power losses, and the current curve 23. The circuit is not a true oscillator but rather a periodically excited free oscillator. The capacitance is charged to a new level at each cycle and operates as a free oscillator between pulses.

Figures 7, 8:
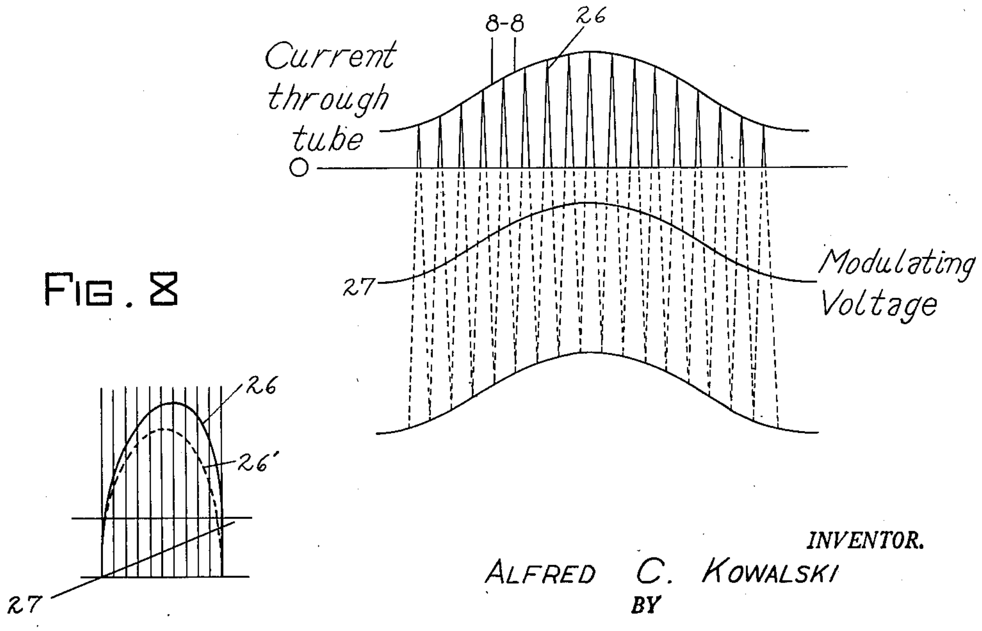
Fig. 7 is a chart of plate current through the output tube as affected by a modulating voltage.
Fig. 8 is an enlargement of a plate current pulse shown in Fig. 7 compared with a characteristic current pulse in the absence of modulation voltage.

This gives rise to a phenomenon illustrated in Figs. 7 and 8 resulting from variation of plate potential during the time the power adding pulse is effective. In Figs. 7 and 8, 26 delineates plate current through the tube resulting from a modulation voltage, shown at 27. In Fig. 8, the plate current 26, as affected by a modulation voltage 27, is compared with curve 26' characteristic of plate current in the absence of any modulation voltage. When the current in the output tube 16 is represented, as in Fig. 7 it is readily seen that the pulse for each cycle varies in amplitude as well as width during the modulation cycles. When a portion of a modulation cycle is expanded, as seen in Fig. 8, a much more important variation is to be noted in the change of shape which the pulse undergoes due to the fact that the plate voltage continues to increase during the period of the pulse. The rate of rise or fall of the modulation voltage determines the degree of wave shape change.

Figure 9:
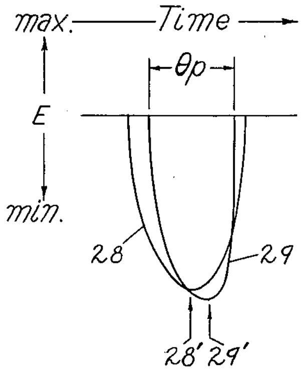
Fig. 9 is a comparative illustration of the magnetic energy of a freely oscillating tank circuit as compared with the magnetic energy of a tank circuit subjected to a power supplying pulse.

The shape of this pulse exerts a considerable influence on the action of the oscillatory tank circuit 18. This is evident in Fig. 9 in which the voltage of a freely oscillating tank circuit is indicated at 28, the voltage due to a power supplying pulse is shown at 29, and $\theta p$ represents "angle of flow." It is noteworthy that although the magnetic field would normally expend all of its energy at point 28', the power supplying pulse does not attain its peak till a somewhat later time, point 29'. The difference of potential between the plate and capacitance results in a flow of electrons which act as a separate wave originating at time 29'.

On the basis of the foregoing it is theoretically possible to increase the amplitude of a sine wave without producing sidebands by supplying power in pulses of zero time occurring precisely when all of the magnetic energy has been converted to static energy in the capacitance.

Attention is now directed to the manner in which a similar effect is accomplished by the present invention. Referring again to Fig. 2, a change of amplitude from $E_1$ to $E_2$ results in a production of sidebands due to the wave distortion experienced in the region 13—14. Operation in pulses to avoid the region 13—14 is suggested as a means of avoiding sidebands. The idea is attractive except for the normal characteristic of the tuned circuit which acts as if it possessed inertia and is reluctant to cease oscillating. This process of decay requires a finite time and is controlled by the amount of resistance in a circuit (taking into account radiation via the antenna).

$i$=instantaneous amplitude of current
I=maximum current $$i=I\ (\sin wt)E^{\frac{-Rt}{2L}}$$

Figure 10:
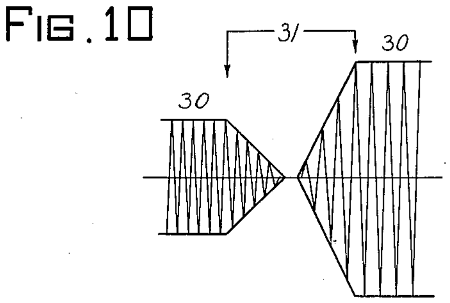
Fig. 10 is a schematic illustration of wave distortion during periods of decay and re-exciting experienced in conventional tuned circuits.

$w$=2ΠX frequency
$t$=time
L=inductance
C=capacity
R=resistance
E—Naperian log base Once oscillations have ceased a process of building-up is necessary before the steady state is again reached. Both of these processes are prolific generators of harmonics. Effectively the undesirable characteristic would appear somewhat as in Fig. 10, in which uniform oscillations are schematically indicated at 30 and distorted oscillations, due to decay and the process of building-up are indicated at 31.

Figure 11:
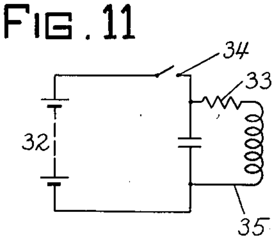
Fig. 11 is an electrical diagram of a system in which it is practical to store energy in an inductance and to control its release therefrom.

Any system of forced oscillation may be employed to start and stop oscillations instantaneously. That is a low source impedance may be employed. To avoid this region, energy is stored in the inductance or introduced instantaneously into the capacity and released as required. In an exemplary circuit, such as that shown in Fig. 11 having a source of power 32, a circuit resistance 33, a switch 34, and a tank circuit 35, it is practical to store energy in the inductance of the tank circuit and to control its release by mechanical means. Current flowing in the circuit of Fig. 11, when interrupted by opening the switch 34, causes the tank circuit 35 to oscillate. The oscillation is a damped wave and decreases in amplitude according to the factor $$E^{\frac{-Rt}{2L}}$$

E=Naperian logarithmic base
R=resistance
$t$=time
L=inductance

By employing a large inductance in the tank circuit 35 and a resistance 33, that is small (no coupled load), oscillation continues for an appreciable period.

Figure 12:
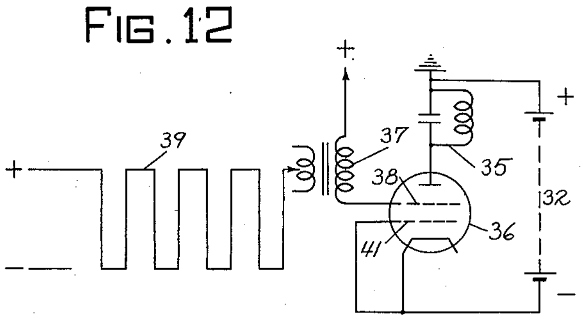
Fig. 12 is an electrical diagram illustrating a system similar in purpose to that of Fig. 11 but providing electronically controlled release of stored energy.
Figure 13:
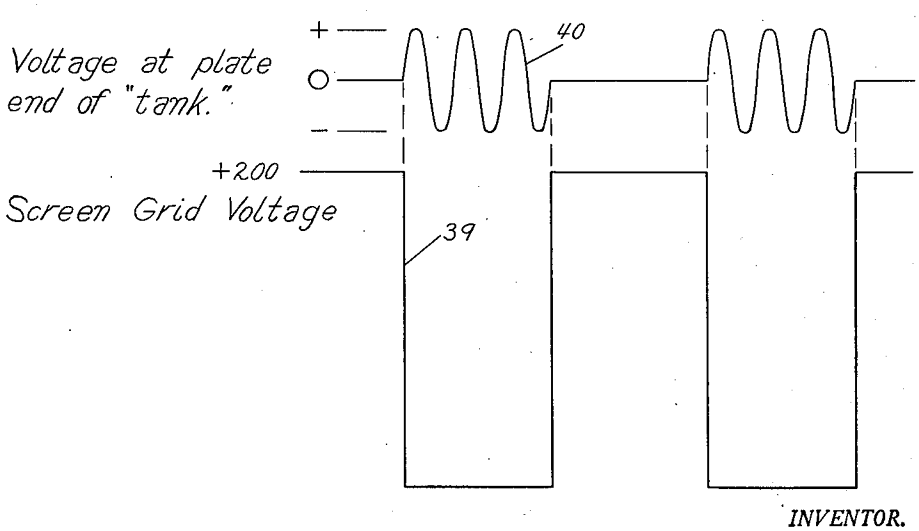
Fig. 13 illustrates the relationship of screen grid voltage and voltage at the plate end of the tank circuit as experienced in the circuit of Fig. 12.

As shown in Fig. 12, a beam power tube 36, such as an 807, is preferably employed as an electronic switch 34 between the tank circuit 35 and the power supply 32. The tank circuit may likewise be placed in series with the cathode and employed to good advantage. The tube is operated as a switch through a transformer 37 connected to a screen grid 38 of the tube 36. The maximum current passing through the tube is limited by the plate dissipation thereof. It is possible to pass 200 milliamperes through the tube at 50 volts, which represents a dissipation of only 10 watts across 250 ohms. Under normal conditions when the maximum current is passing through the tube and inductance, the tank circuit does not oscillate, but energy is contained in the magnetic field of the inductance. By applying a square negative pulse, indicated at 39, to the screen grid 38 of the tube sufficiently large to cut off electron current to the plate of the tube 36, the energy in the magnetic field is transformed into an oscillatory current at a frequency determined by the tank circuit 35 completely isolated from the tube. The oscillation of the magnetic field continues to the end of the pulse, which is made to occur just after the negative maxima of a cycle. The relationship of the screen grid voltage 39 and the voltage 40 at the plate end of the tank circuit 35, is illustrated in Fig. 13. The capacitance of the tank circuit is allowed to discharge but the circuit is prevented from freely oscillating by the low resistance of the tube 36 and power supply 32 shunted across the tank circuit. By careful attention to the mechanical construction of the tank circuit and complete isolation, the starting characteristic is made very smooth. Similarly, by precise adjustment of the pulse time and shape, the termination of oscillation is made virtually harmonic-free. Thus a convenient system is provided for producing short pulses of radio frequency energy which, during the period of transmission, are substantially the same as carrier wave in character. This is true only in the absence of any load imposition of the circuit. Later circuits will be shown indicating methods of eliminating all decrement and utilizing this voltage without disturbing its character.

Figure 14:
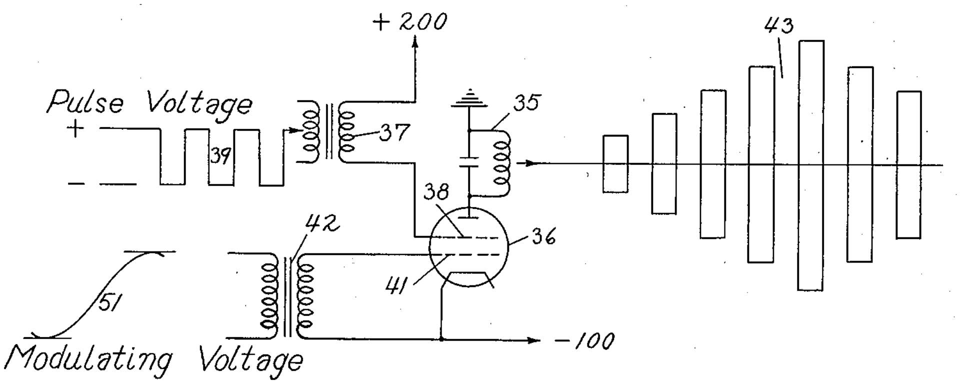
Fig. 14 is an electrical diagram of the system illustrated in Fig. 12 modified to accept a modulating voltage.

As previously described, current through the inductance of the tank circuit is dependent upon tube resistance. Therefore if the potential on a control-grid of the tube is varied, electron current can be controlled in response thereto. To this end, the tube 36 is provided with a control grid 41 and the circuit shown in Fig. 12 modified as shown in Fig. 14, to incorporate a transformer 42, the primary of which has a modulating voltage, such as 51, impressed thereon and the secondary of which is connected at one side to the control grid 41 and at the other to the cathode of the tube. When the potential on the control-grid is varied in response to a modulating voltage 51, presently more fully described, electron current through the tube is increased and decreased in response thereto. It is important to note that variation of the control grid potential has no effect when the tube 36 is cut off by the negative pulse on the screen grid 38, consequently it does not affect the oscillatory tank circuit 35 which consists of the isolated inductance and capacitance. The sole effect of varying this potential is to control the magnetic field during the resting period when the tank circuit 35 is not oscillating, thereby establishing the energy level or amplitude of the next pulse. Modulation on this basis consists of varying the energy level while the tank circuit is at rest, consequently the amplitude of each pulse increases and decreases according to the modulation signals, but the character of each pulse remains the same, as demonstrated at 43. Thus side bands are minimized. For satisfactory demodulation, the number of pulses is required to be high in relation to the highest modulating frequency. For television, each element is preferably transmitted as a separate pulse.

*Transmitter*

Figure 15:
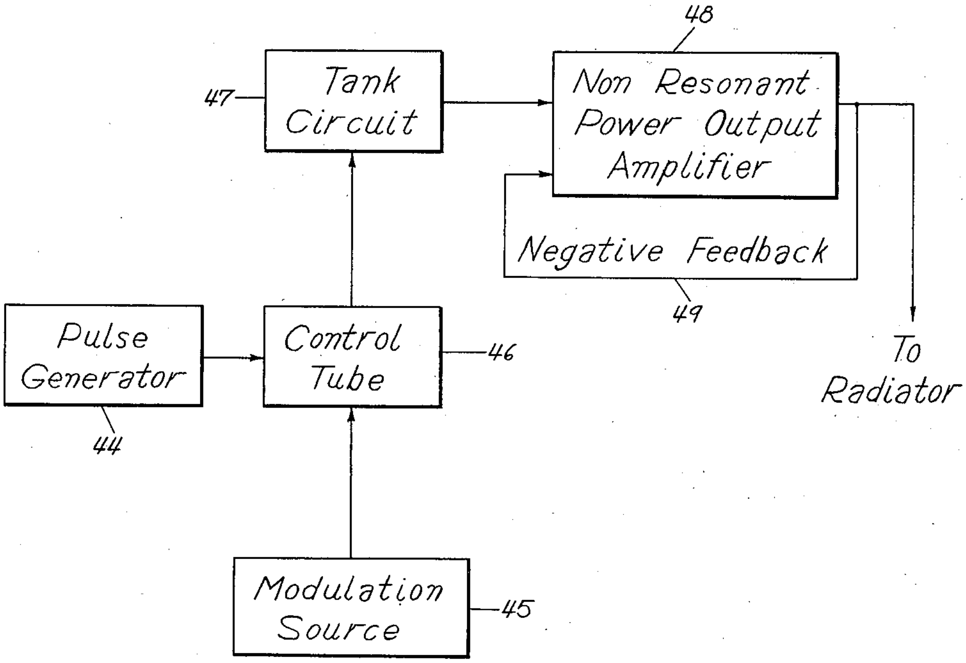
Fig. 15 is a block diagram of a typical transmitter of the present invention.

Having demonstrated that a pulsed transmitter controlled pulse starting and stopping characteristics possesses properties akin to an uninterrupted and unvarying carrier wave, and obviously differing from the pulse-time modulation method or radar type of pulsing, an embodiment of the present invention is schematically shown in Fig. 15. It is obvious that the essential qualities for transmission by the method of the present invention may be attained in various ways. The essential requirements are:

(1) No transmission during a period of change.

(2) No free oscillation effects subsequent to modulation.

In Fig. 15, a pulse generator 44 and a modulation source 45 are shown in monitoring relation to a control tube 46. The control tube 46 may conveniently take the form of tube 36, already described. The control tube is connected to a tank circuit 47, such as the tank circuit 35, already described. The tank circuit is in turn connected to a low impedance power output amplifier 48 provided with negative feedback 49. The tank circuit provides electromagnetic waves of radio frequency which for convenience are hereinafter referred to as carrier waves. The tank circuit may be considered as a means for converting tube current into radio frequency current of predetermined frequency.

Figures 16, 17:
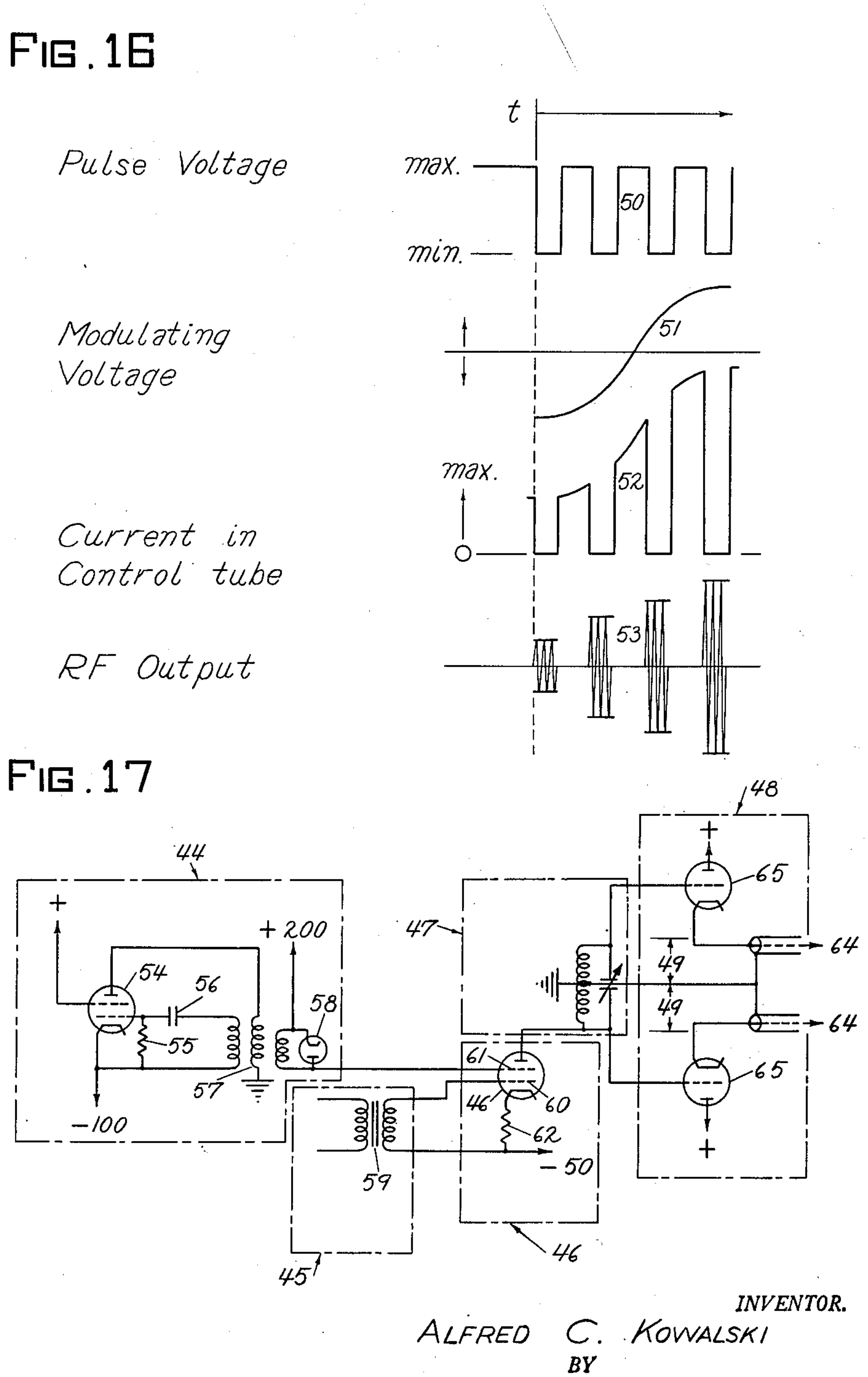
Fig. 16 is a chart of characteristic waves ocurring at various points in the transmitter of Fig. 15, as designated.
Fig. 17 is a diagram of an electrical system illustrated in block form in Fig. 15.

The operation of the transmitter illustrated in Fig. 15 is more clearly apparent when reference is had to the wave charts of Fig. 16 having a common time scale. Pulse voltage characteristic of the current moving from the pulse generator 44 to the control tube 46 is shown at 50. An illustrative modulating voltage impressed by the modulating source 45 on the control tube 46 is shown at 51. The current in the control tube resulting from the combining of the pulse voltage and the modulating voltage is graphically presented at 52. 53 exemplifies a resultant radio frequency output from the tank circuit 47. 53 illustrates the complete absence of R. F. output during periods of change.

It is obvious that the block system illustrated in Fig. 15 and the results charted in Fig. 16 may be achieved by several specific electrical circuits. An exemplary circuit is shown in Fig. 17 in which the blocks of Fig. 15 are shown in dotted line for purposes of clarity. The pulse generator 44 conveniently includes a type 807 tube 54, a grid resistor 55, a blocking condenser 56, a coupling transformer 57, and a damping diode 58 wired as shown in the usual way. An audio transformer 59 is shown in the modulation source 45, the remainder of the modulation source being of any convenient form. There being no invention in the modulating source, further description of the same is omitted. The modulation source is not limited to the audio type, it being clearly apparent that television and multiplex modulation may be employed, as desired. The type 807 beam tube having a control grid 60 and a screen grid 61 is employed as the control tube 46 because of its low resistance and the convenience afforded by the two grids. The pulse generator 44 is connected to the screen grid 61. The audio transformer 59 is connected at one side to the control grid 60 and at the other side to the cathode of the control tube 46 through a cathode resistor 62 and to −50 volts. The anode of said tube is connected to the tank circuit 47. The center tap is grounded. The tank circuit is designed for low loss and complete isolation. The tank circuit connects directly to the grids of the push-pull amplifier 48 from the tank circuit. The push-pull amplifier in turn feeds a suitable radiation antenna through transmission lines 64. The amplifier employs a pair of tubes 65 as cathode followers. This offers two advantages. The input, because of its high impedance, does not require power from the tank circuit and the low output impedance effectively damps all transmission equipment as well as the antenna. This is considered a significant feature. A negative feedback similar to that shown at 49 in Fig. 15, is indicated at 49 in Fig. 17.

Negative pulses produced by the pulse generator 44 are applied to the blocking grid 61. In the normal condition, a heavy current flows through tube 46, while tube 54 is cut off due to a previous charge on the capacitance 56 in its grid. As 54 begins to conduct, a negative pulse is formed across the pickup winding of coupling transformer 57 which cuts off current in the tube 46. The use of a common power supply for tubes 54 and 46 offers the advantage that the load is approximately balanced; that is, the current through one tube increases as the other decreases.

In designing the pulse generation, it was borne in mind that the screen grid to anode capacity must be considered as part of the load, and that the voltage swing must be made large so that a square wave can be approximated. The tendency of the tertiary winding to oscillate is eliminated by diode damping, at 58.

Modulation is accomplished by varying the potential on the control grid 60. This method was selected because of its simplicity and the ease with which negative feedback can be incorporated. The latter is highly desirable inasmuch as operation with a near-zero load results in extreme non-linearity.

Other types of amplifiers may be used, but it is essential that no free oscillation be possible at any point. The requirements of high impedance input and low impedance output can be satisfied by various other combinations of inverse feedback (or balanced positive and negative feedback), but care must be taken that the character or relative amplitude of the transmitted pulses is not affected by these circuits.

In order to reduce harmonics due to the normal decrement of free oscillations, a feedback arrangement is used to add energy to the tank circuit during oscillation, as illustrated in Fig. 18 and acts as a negative resistance to exactly balance circuit losses. The control tube 46 and tank circuit 47 of Fig. 17 are illustrated again in Fig. 18 to indicate the feedback arrangements in association therewith, employing a triode tube 66. The tube is biased by a cathode resistor 67 bypassed by a condenser 68. The grid connects directly to the anode of the tube 46 and a coupling coil 69 from the anode of the tube 66 feeds energy to the tank circuit 47. The result is a substantially constant wave. This expedient does not militate against the effective damping of the tank circuit due to low resistance of the tube 46 during resting periods.

For an example of typical operating conditions a one-microsecond pulse is chosen with a resting time of approximately one-microsecond between pulses. The tank circuit 47 is tuned to 3 megacycles to allow 3 full cycles to appear for each pulse. At a modulating frequency of 1000 cycles, 500 pulses per cycle result, or at 10,000 cycles, 50 pulses per cycle as shown in Fig. 19. Exact determination of operating conditions depends on service for which intended, operating frequency, and highest modulating frequency.

The resonant characteristics of the radiating antenna cannot be overlooked. However, due to its dimensions, the antenna often acts as a highly damped circuit at low frequencies. Non-resonant antennas, or close coupling to a low-impedance source, eliminate this as a problem at the higher frequencies. The same precautions that must be considered in the construction of wide-band television antennas are applicable here.

The transmitters of the present invention transmit intelligence as integral units of radio frequency energy, and by controlling the energy level of each individual pulse by means of a modulating signal effective only during the resting period, no sidebands result from the change of energy level.

*Receiver*

Reception of this type of transmission is not possible with ordinary types of receivers which invariably depend on hi-Q tuned circuits for coupling purposes. Analysis of such a circuit reveals that essentially it involves a transfer of energy at a high level of impedance. Normally this is a desirable characteristic, inasmuch as it enhances selectivity and results in a high voltage input at the terminals of the succeeding stage. However, such a circuit exhibits all the characteristics of a freely oscillating circuit. In other words the primary does little more than excite the freely oscillating circuit. Discontinuance of power from the primary does not result in a cessation of oscillation in the freely oscillating circuit; oscillation will continue until all energy has been dissipated as in any lightly damped circuit.

Obviously this method is unsuitable for the reception of pulses. In the case of radar and television the problem was circumvented by damping the tuned circuits by means of shunt resistance. Whether the successful reception of pulses was due to the broader response and consequent admission of sidebands, or to the increase of damping resulting in a shorter period of free oscillation is not important; the net result was the same. Nevertheless the requirements of pulse reception proved incontrovertibly the dependence of vacuum tube amplifiers on tuned coupling-circuits for high gain.

In order to satisfy the requirements of the transmission system described in the preceding part, the radio-frequency amplifier of the receiver must not manifest oscillatory effects; but in order to realize its full potentialities, reception must be confined to a very narrow band. Thus we have the requirements heretofore considered incompatible: high selectivity and no tuned circuits. The present invention circumvents these apparently incompatible requirements by combining an untuned radio-frequency amplifier and a non-resonant filter which by-passes all frequencies except the desired frequency.

Attention is first devoted to the untuned radio frequency amplifier of the present invention which essentially comprises a voltage amplifier capacitively coupled to a cathode follower.

For illustrative purposes, a resistance-coupled amplifier is shown in Fig. 20 comprising a series connected power source 70, cathode resistance 71, beam power tube 72, and an anode resistance 73. The amplifier load, represented as $E_{out}$, is shunted across the beam power tube in series with a coupling condenser 75. $R_1$ represents the resistance offered by the anode resistor 73, R the resistance offered by the tube 72 and $Z_L$ the impedance offered by the amplifier load. It is clearly evident from the equivalent circuit of Fig. 21 that when the load is large (low $Z_L$) in relation to the resistance through the tube, the net result is a combination of parallel resistances, one large (R—resistance through tube) and one small ($Z_L$—actual load). Obviously small changes of the resistance through the tube (R) have little effect on the total resistance. If, on the other hand, the resistance through the tube is small in relation to the load, then the voltage at the junction of R and $R_L$ will be almost entirely dependent on the value of R (the variable element) for small changes of R. Thus amplification is a function of $R_L$, whereas R represents the output impedance, and, within certain limits, each can be controlled separately.

Since $Z_L$ is the actual load to which we adjust the circuit it cannot be changed therefore the objective must be to reduce the resistance through the tube. Operation under the stipulated conditions is achieved by operating the tube with an extremely low plate-potential and relatively high current. The characteristics of a pentode or beam tetrode make such operation feasible; however, large amplification by this means is possible only if the voltage to be amplified is extremely small (microvolts).

As an example, the resistance through a 6AK5 miniature pentode becomes 2500 ohms at 30 volts and 12 ma. This operating condition can represent a gain of some 200 if 540 volts is applied to the plate through a 45,000 ohm load resistor. Much higher gains are possible if the supply voltage is increased, however this large gain is not realized unless the actual load shunted across the tube is much higher than the 2500 ohm resistance through the tube. It is apparent from this that, at radio frequencies, the output of a voltage amplifier must be delivered to a high impedance device. The significance of the last statement is that a voltage amplifier requires an impedance transformer between the output of one stage and input of another. A cathode follower meets this requirement admirably; it has a high impedance input and low impedance output, therefore it complements the characteristics of the voltage amplifier.

In an exact analysis of the type of operation which makes possible large amplification at high frequencies and extends the high frequency limit of the cathode follower, it is seen to differ entirely from the conventional approach in that it discards the concept of plate resistance in the calculation of amplification and substitutes actual resistance through the tube. In Fig. 22 a tube is regarded as a controlling element in a resistance, capacity, voltage-divider circuit consisting of a plate resistor and total equivalent load capacity ($C_{eq}$), in the case of the voltage amplifier, and the resistance through the tube in series with a total load capacity in the cathode circuit, in the case of the cathode follower. These factors are conveniently demonstrated by reference to Figs. 22, 23, 24, 25 and 26.

Fig. 22 is a representation of a conventional voltage amplifier, including an amplifying tube 80, a cathode resistor 81, which is grounded as at 82; a plate resistor 83; a grid resistor 84; and a screen by-pass condenser 85, arranged as shown. 86 represents a coupling condenser whereby the voltage amplifier is capacitively coupled in the present invention to a cathode follower, employing a grid resistor 87. The cathode follower is presently more fully described. The input voltage of the voltage amplifier is represented at 88. Fig. 23 is a representation of an equivalent circuit to that shown in Fig. 22. $R_c$ represents the resistance of the plate resistor, R the resistance of the tube 80, and $R_k$ the resistance of the cathode resistor 81. The total equivalent load capacity, ($C_{eq}$), charges through $R_c$ to a voltage determined by the relation of R and $R_c$. R is made small relation to the reactance of $C_{eq}$ by proper choice of the tube and operation at extremely low voltage and high current. With a small voltage applied to the grid of the tube 80, R varies so as to partially discharge $C_{eq}$, or to allow $C_{eq}$ to charge to a higher voltage. This is demonstrated by reference to Fig. 24 wherein the abscissa represents time and the ordinate voltage. 89 is a normal charging curve of a condenser through a resistor. 90 represents an amplified voltage. Attentuation of the high frequencies depends on the relation of the slope of the amplified voltage 90 to the slope of the charging curve 89 at the operating level and may be calculated from this relation.

Fig. 25 illustrates a conventional cathode follower having a tube 91; a cathode resistor 92, which is grounded as at 93; the grid resistor 87 and a screen dropping resistor 94, associated as shown. The screen grid potential is kept constant with respect to the cathode by coupling between cathode and screen by means of the condenser 95. The input of the cathode follower is indicated generally at 96 and the output at 97. Fig. 26 is an equivalent circuit in which $C_{eq}'$ represents an equivalent load capacity and 98 a supply voltage. The resistance of the tube 91 is represented by R′ and the resistance of the cathode resistor 92 by $R_k'$. In an analysis of the cathode follower similar to the preceding analysis of the voltage amplifier, the cathode follower is seen to be a resistance-capacity, voltage-divider circuit. Charging through $C_{eq}'$ occurs through the tube resistance R′ and discharging through the cathode resistor $R_k'$. Thus demonstrating that contrary to popular impression a pentode or beam power tube can be made to operate to higher frequencies than a triode if the resistance through the pentode is lower.

On the basis of the foregoing analysis, the circuit of Fig. 27 was devised as a flexible adaptation suited to the requirements. Each stage consists of a voltage amplifier, designated generally as 107, capacitively coupled as at 108 to a cathode follower 109. It is clearly apparent that as many stages may be employed as required for a given purpose. 110 represents the input of the cathode followers, 111 triode tubes, such as the dual triodes 6J6; 112 a grid resistor; 113 a cathode resistor, and 114 the output. One side of the input is electrically connected to the grid of the triode tube, as shown. The cathode resistor is interposed between the cathode of the tube and a ground 115. The grid resistor 112 is interposed between the grid of the tube and the ground side of the input to which the cathode resistor is attached. The dual anodes are maintained at positive potential as indicated. The output 114 is taken across the cathode resistor.

The voltage amplifiers employ amplifying tubes 116, such as a beam tetrode 6AG5 or 6AK5 pentode. 117 represents a screen grid variable resistor and 118 a plate resistor. The control grid of the tube is grounded, as at 119 and a screen grid of the tube 116 is maintained at positive potentional through the screen grid variable resistance 117. The cathode of the tube 116 is connected to the cathode of the tube 111 of the cathode follower, already described. A succeeding cathode follower 109 is provided for the voltage amplifier 107. The anode of the amplifying tube 116 is connected to the grid of the triode 111 of the succeeding cathode follower by way of the coupling condenser 108. Thus, the input 110 of the succeeding cathode follower comprises the connection through the coupling condenser and a connection with the cathode resistor of the preceding cathode follower. As previously stated, the interconnected voltage amplifier and cathode follower may be repeated as desired to achieve any requisite number of stages. Bias for each amplifying tube 116 is obtained in a very simple manner from the preceding triode 111 and allows for operation with a grounded grid, thus eliminating the noise introduced by gas currents through the grid resistor. The major advantage, however, results from the simplicity with which negative feed-back at the cathode follower 109 can be enhanced by direct coupling from the cathode of the triode 111 thereof through resistor 120, shown dotted. The principal purpose of the latter is to increase the input impedance of the cathode follower.

The preferred system illustrated in Fig. 27 is subject to modification directed to the increasing of the frequency range. For example, the upper frequency limit may be controlled by the shunting effect of the plate-cathode capacity of the pentode amplifier tube 116. Thus, to increase the upper frequency limit, alteration of the physical design of the tube is required. A suggested modified tube 129 for accomplishing the intended purposes is illustrated in Fig. 28. 130 represents the base of such a tube, 131 the envelope thereof, 132 the anode, 133 the cathode, 134 a control grid, 135 a screen grid, and 136 a suppressor grid. As shown, the plate connection is preferably brought to the top of the envelope through a low inductance connection 137. This results in a reduction of the output capacitance of the tube. The anode, which is the only element of the tube on which the high level signal appears, is effectively isolated from all low level elements. This latter effect is enhanced by the suppressor grid 136, whose specific purpose is the shielding of the anode 132.

The modified tube 129 of Fig. 28 is substituted, for the amplifying tubes 116 previously described as shown in Fig. 29 and may be employed with advantage in any resistance-capacitance coupled circuit. The remaining elements shown in Fig. 29 have already been described in connection with Fig. 27 and their description is not here repeated. The suppressor grid 136 is connected with the cathode of the triode tube 111 employed in the succeeding cathode follower by means of a short section shield 138 housing the coupling condenser 108 which electrically interconnects the anode 132 of the modified tube 129 and the grid of said triode tube 111. This expedient results in a high impedance between the suppressor grid 136 and the anode 132 of the modified tube.

Normally the screen grid 135 is maintained at a relatively low potential (60–90 volts) in order to extend the constant-current region, however, the screen provides the one variable element which makes possible the accurate setting of the potential at the anode 132 to a desirable operating point. Since the potential at the anode is critically dependent on the current through the tube, strict control of the voltage input as well as of the filament voltage is essential. Otherwise the circuit is well stabilized, and requires periodic adjustment of screen grid potential to compensate for change of emission characteristics only.

The two-tube combination of voltage amplifier 107 and cathode follower 109, as shown in Figs. 27 and 29 must be regarded as a unit, and designed as such. The potentialities of the voltage amplifier cannot be realized unless the cathode follower is provided as a means for transforming the relatively high-impedance output to a lower impedance, whereas the cathode follower alone is of no value as a voltage amplifier. Further evidence of mutual inter-dependence is noted in the unique manner in which the input cathode follower provides a fixed bias for the voltage amplifier. The normal low-impedance characteristic of the cathode follower 109 insures a perfectly stable grid bias and eliminates the usual cathode by-pass condenser and grid resistor.

*By-pass filter*

The untuned amplifier for radio frequencies described above accepts all frequencies within its range and requires an auxiliary means for selecting the desired frequency, or discriminating against all undesired frequencies. The system employed can be considered a by-pass filter which shunts all undesired frequencies and presents a high impedance to desired frequency.

In Fig. 30, a by-pass filter of the present invention is shown in combination with a fragment of an untuned radio frequency amplifier employing cathode followers 109 and voltage amplifiers 107 capacitively coupled as at 108 to form as many stages as desired. The by-pass filter takes the form of a simple shunt arrangement by-passing a stage of said untuned R. F. amplifier. In the filter, 150 represents a triode filter tube, 151 a plate resistance therefor, 152 a tuned tank circuit connected to the cathode of the tube, 153 a bias battery, 154 a grid resistor, and 155 a coupling condenser. The tuned tank circuit is preferably paralleled by a negative resistance network schematically indicated at 156. The negative resistance network may take any convenient form such as a separate tube and oscillator circuit. The tuned circuit is arranged in series with the cathode of the tube. The battery serves to bias the grid with reference to the cathode. Said grid is electrically connected to the anode of the amplifying tube 116 in the voltage amplifier 107 of one of the stages of the untuned amplifier through the coupling condenser 155 and a series resistor 157 for impedance adjustment. The tuned circuit 152 is preferably grounded as at 158.

Connected as described, the grid-cathode capacity of the filter tube 150 acts as a shunting element. An applied signal appearing on the grid causes a signal of similar polarity and phase to appear on the cathode when the cathode employed possesses high resistance properties. The tuned circuit 152 provides this high resistance for the desired frequency, whereas all other frequencies encounter a reduced impedance, with a corresponding phase shift. This effect is further enhanced by the insertion of the load resistor 151 of suitable resistance characteristics in the plate circuit.

It is noteworthy that the rejection of undesired frequencies is a result of the low impedance presented by the grid-cathode capactiy and the grid-plate capacity of the filter tube 150 in relation to preceding high impedance source 107.

The ability of the circuit to discriminate between signals is dependent on the "Q" of the tuned circuit 152. The negative resistance network 156 serves to increase the effective "Q" of the tuned circuit. Various oscillator circuits are appropriate but it is imperative to note that free oscillation is impossible as the low impedance of the cathode follower effectively damps any such tendency. The filter circuit is therefore useful not only for the specific purpose for which it was designed, but for the study of transient phenomena inasmuch as it introduces no component of the resonant frequency nor any harmonics due to the natural decrement of a lightly damped filter circuit containing resonant elements.

Although the filter provides excellent rejection characteristics, it is normally employed after a certain degree of amplification has been attained, and since the presence of a large undesired signal would interfere with the proper operation of the amplifier, a voltage of opposite phase is taken from the plate of the filter tube 150 and applied to the input 110. The net result is a substantial improvement in selectivity due to the rejection of undesired frequencies at the input to the amplifier. The plate of the filter tube 150 is electrically connected to the grid of the triode tube 111 in the cathode follower 109 through a coupling means comprising a condenser 159 and a resistance 160.

The R. F. untuned amplifier of the present invention having been described as consisting of capacitively coupled stages, each stage preferably comprising a combined voltage amplifier 107 and cathode follower 109, and the by-pass, self-damping filter also having been described; reference is made to Fig. 31 illustrating a receiver of the present invention in block form. 161 represents an antenna and 162 a ground for the receiver. Untuned R. F. amplifiers, of the type described, are indicated generally at 163. A by-pass filter employed in shunt relation to the first untuned amplifier is shown at 164. 165 represents a detector and 166 an audio amplifier leading to the output 167 of the receiver. The detector and audio amplifier are of general conventional form.

The power supply (not shown) requires little comment other than to mention that it is preferable to control the voltage so that the high voltage and filaments of the amplifying tubes 116 are regulated. The tubes 111 of the cathode followers 109 are self-compensating and require no regulation.

The method and apparatus of the present invention are clearly apparent from the foregoing description and are briefly reviewed at this point.

It is a well-known fact that no sidebands accompany the production of an unvarying electromagnetic wave. Thus the transmission of intelligence by means of a succession of pulses, each pulse constant in amplitude and resembling all other pulses in character but differing in amplitude in accordance with a modulating signal, minimizes or eliminates side bands. The pulses are conveniently of constant duration but obviously may be varied without departing from the spirit or scope of the present invention. Desired fidelity in intelligence transmission is achieved by employing a moderately large number of pulses in relation to the unit of time corresponding to one cycle of the highest modulating frequency. Each pulse is caused to reach its maximum point prescribed by the modulating signal within its first half cycle and to maintain this level to the end of the pulse. Termination of the pulse occurs precisely at the point corresponding to the steady state or quiescent condition of the circuit. Regardless of the type of circuit employed, it is imperative that modulation changes occur during said quiescent period and not otherwise.

Reception of this type of transmission requires amplification by means which do not alter the character of the received pulses. The natural tendency of the tuned circuit to oscillate freely is cited as a detrimental factor responsible for the distortion of the pulses described above. The present invention successfully overcomes the problems induced by oscillation in the R. F. amplifier by eliminating tuned circuits as coupling mediums. The capacitive coupling of the voltage amplifier 107 with the cathode follower 109 to form the stages of an untuned amplifier and the employing of the by-pass filter 164 in shunt arrangement therewith, as described, provides a receiver excellently suited to the purposes of pulse reception. Successful operation of the voltage amplifiers in the successive stages of an untuned amplifier requires a low impedance output and a high impedance input to the succeeding circuit. The impedance transformer conveniently takes the form of a vacuum tube used as a cathode follower. The output impedance of the voltage amplifier is made substantially lower than the input impedance of the shunting load by adjustment of operating point on the basis of a novel approach to vacuum tube amplification which is generally applicable to all amplification problems. Not only is this considered a significant innovation but stress is also placed on the circuits described. The use of direct coupling for transmission of power at low impedance level, and capacitance coupling to a high impedance are outstanding features tending to reduce phase shift. Moreover the means whereby the cathode follower provides bias for the voltage amplifier and permits operation with the grounded grid is noteworthy. The combination of the voltage amplifiers and cathode followers, as described, is generally useful as a wide-band amplifier and is adaptable for use at audio or video frequencies with slight modifications. It offers advantages in the extension of the useful range of audio or video amplification to higher frequencies.

The filter 164 employed is of the self-damping type. It is referred to as a self-damping filter because of an inherent property which prevents free oscillation of the tuned circuit associated with it. Fundamentally the filter operates in such a way that all undesired frequencies are by-passed, or attenuated, and the desired frequency subjected to a high impedance. The utilization of the interelectrode capacitance of a vacuum tube for the elimination of undesired frequencies is an innovation having value even when not associated with an oscillator. However, the inclusion of the negative resistance 156 is of distinct value.

Interfering noise being proportional to band width, the present method of radio communication obviously is subjected to a minimum of interfering noise. Further, an additional obvious advantage is achieved by the requiring of an exceedingly narrow transmission band resulting in an economy of the radio frequency spectrum available for communication. Adjacent channel interference ceases to be a factor in determining the limit placed on modulation frequency.

It is to be understood that the present invention is not limited to ordinary audio-broadcast, but is excellently adapted to other uses. The methods of communication and the systems for accomplishing such methods hold forth advantages for specialized applications where freedom from interfering noise and channel economy are compelling factors; such as in aircraft communication, long distance and trans-oceanic telephonic communication, long distance television, Teletype, and in multiplex signaling generally.

While this invention is described in terms of certain embodiments, it is obvious that my invention is susceptible to modification without departing from the spirit and scope thereof. I do not wish, therefore, to be limited by the disclosure set forth but only by the scope of the appended claims.

Having described my invention, what I claim as new and desire to secure by Letters Patent is:

1. A system for communicating intelligence on a narrow frequency band by the transmission and reception of regularly spaced pulses differing in amplitude in response to intelligence impressed thereon each of which pulses consists of a series of homogeneous electromagnetic waves comprising a source of radio frequency electromagnetic waves of constant form, amplitude and frequency, means for alternately blocking and transmitting the radio frequency energy in pulses each consisting of a plurality of radio frequency waves of substantially identical form and amplitude, the waves of the pulses being of common frequency and each pulse starting and stopping coincident with zero potentials of the radio frequency wave of which it is formed, means for changing the amplitude of the radio frequency waves between transmitted pulses in response to intelligence to be transmitted, a receiving antenna for the transmitted pulse, an untuned amplifier coupled to the antenna consisting of capacitively coupled stages in which each stage comprises a cathode follower directly connected to a voltage amplifier, self-damping filter electrically connected in shunt relation to the untuned amplifier whereby a high impedance is presented to predetermined frequencies and other frequencies by-passed through the filter, and an amplifier connected to the untuned amplifier for the amplification of frequencies encountering said high impedance in the filter.

2. A transmitter for amplitude modulated pulses comprising in combination a control tube having a cathode, an anode, and a plurality of grids; a pulse generator connected to one of the grids and periodically applying negative pulses thereto; modulating means connected at one side to another of the grids and at the other side to the cathode of said tube; a tank circuit characterized by low loss and complete isolation energized from the anode; and a low impedance amplifier having high impedance input and low impedance output coupled to the tank circuit whereby modulation is accomplished by varying the potential on one of the grids, current through the control tube blocked by negative pulses applied to another of the grids during all periods of change of amplitude due to modulation, and regular pulses of electromagnetic energy produced of amplitude varied in response to intelligence impressed thereon by the modulating means, the individual pulses comprising waves of substantially uniform amplitude.

3. In a transmitter, the combination of a control tube having an anode, a cathode, a control grid, and a screen grid; modulating means connected to the control grid and the cathode and varying the potential of the control grid in response to intelligence to be transmitted; a pulse generator connected to the screen grid and supplying negative pulses thereto synchronously with the periodical modulation of the tube current and of sufficient strength to block tube current thus rendering modulation changes completely ineffectual during pulse production; a tank circuit characterized by low loss and complete isolation energized from the anode of the tube by current through the tube; means arranged to supply energy to the tank circuit during periods of oscillation thereof to compensate for power losses therein; low impedance amplifying means possessing high impedance input and low impedance output coupled to the tank circuit; and a radiating antenna excited from the amplifier whereby amplitude modulated waves of radio frequency are transmitted in pulses whose amplitude is varied in response to intelligence transmitted, the individual pulses consisting of waves of substantially uniform amplitude and duration.

4. In a system for transmitting and re-producing intelligence on a narrow band of radio frequencies, the combination of means for producing a carrier wave of constant frequency and wave form, modulating means having electrical connection with the carrier wave producing means adapted to activate said carrier wave producing means for production of its characteristic carrier wave output of constant frequency and wave form and at amplitudes varied in response to intelligence impressed on the modulating means, means interposed the modulating means and the wave producing means periodically interrupting electrical connection therebetween synchronously with amplitude variations in the modulating means whereby the wave producing means develops time-spaced pulses each consisting of a series of homogeneous electromagnetic waves being of constant amplitude within each individual pulse and varying between pulses in response to modulation, means for receiving the transmitted pulses, an untuned amplifier for increasing the amplitude of the received pulses, a self-damping filter connected to the untuned amplifier for by-passing all frequencies but that of the carrier wave, and amplifying means coupled to the detector for the amplification of the modulating wave.

ALFRED C. KOWALSKI.

REFERENCES CITED

The following references are of record in the file of this patent:

UNITED STATES PATENTS

| Number | Name | Date |
|---|---|---|
| 2,086,890 | Currier et al. | July 13, 1937 |
| 2,168,874 | Lewis | Aug. 8, 1939 |
| 2,199,634 | Koch | May 7, 1940 |
| 2,227,108 | Roosenstein | Dec. 31, 1940 |
| 2,245,652 | Dickert | June 17, 1941 |
| 2,266,401 | Reeves | Dec. 16, 1941 |
| 2,273,997 | Rubin | Feb. 24, 1942 |
| 2,294,411 | Lay | Sept. 1, 1942 |
| 2,330,109 | Brown | Sept. 21, 1943 |
| 2,358,428 | White | Sept. 19, 1944 |
| 2,366,358 | Schlesinger | Jan. 2, 1945 |
| 2,379,900 | Hansell | July 10, 1945 |
| 2,401,618 | Crosby | June 4, 1946 |
| 2,404,306 | Luck | July 16, 1946 |
| 2,411,166 | Olson | Nov. 19, 1946 |
| 2,412,964 | Chatterjea | Dec. 24, 1946 |
| 2,416,304 | Grieg | Feb. 25, 1947 |
| 2,419,292 | Shepard | Apr. 22, 1947 |
| 2,423,304 | Fitch | July 1, 1947 |
| 2,426,205 | Grieg et al. | Aug. 26, 1947 |
| 2,426,216 | Hight | Aug. 26, 1947 |
| 2,433,758 | Hershberger | Dec. 30, 1947 |
| 2,434,400 | Easton | Jan. 13, 1948 |
| 2,435,496 | Guanella et al. | Feb. 3, 1948 |
| 2,444,455 | Labin et al. | July 6, 1948 |
| 2,470,573 | Moore | May 17, 1949 |
| 2,476,997 | Nayes | July 26, 1949 |